US007191958B1

(12) United States Patent
Wang

(10) Patent No.: US 7,191,958 B1
(45) Date of Patent: Mar. 20, 2007

(54) REVOLVING LAWN SPRINKLER

(76) Inventor: Hsin-Fa Wang, P.O. Box 453, Taichung (TW)

(*) Notice: Subject to any disclaimer, the term of this patent is extended or adjusted under 35 U.S.C. 154(b) by 647 days.

(21) Appl. No.: 10/718,685

(22) Filed: Nov. 24, 2003

(51) Int. Cl.

| | |
|---|---|
| ***A01G 25/06*** | (2006.01) |
| ***B05B 15/06*** | (2006.01) |
| ***B05B 15/10*** | (2006.01) |
| ***G01H 3/04*** | (2006.01) |

(52) U.S. Cl. ...................... 239/200; 239/201; 239/203; 239/204; 239/205; 239/206

(58) Field of Classification Search ................ 239/200, 239/201, 203, 204, 205, 206, 451, 457
See application file for complete search history.

(56) References Cited

U.S. PATENT DOCUMENTS 3,703,990 A * 11/1972 Erickson ...................... 239/11
4,773,595 A * 9/1988 Livne .......................... 239/242
5,718,381 A * 2/1998 Katzer et al. .......... 239/222.11
5,720,435 A * 2/1998 Hunter ........................ 239/204
5,823,439 A * 10/1998 Hunter et al. ............... 239/205
6,138,924 A * 10/2000 Hunter et al. ............... 239/204

* cited by examiner

*Primary Examiner*—Davis Hwu
(74) *Attorney, Agent, or Firm*—Egbert Law Offices

(57) ABSTRACT

A revolving lawn sprinkler comprises a rotary guide plate by which the water flow is so controlled as to actuate a lobed wheel, which in turn actuates a rotary disk via a transmission mechanism. A nozzle is mounted on the rotary disk and is provided with a movable joint. The rotary guide plate is forced to change its revolving direction at such time when a projection of the rotary disk comes in contact with a locating block of a top cover of a housing of the lawn sprinkler.

3 Claims, 10 Drawing Sheets

REVOLVING LAWN SPRINKLER

BACKGROUND OF THE INVENTION

1. Field of the Invention

The present invention relates to a revolving lawn sprinkler capable of automatic adjustment of revolving angle thereof.

2. Description of Related Art

The conventional stationary lawn sprinkler is limited in function in that it is incapable of distributing water in various angles.

SUMMARY OF THE INVENTION

The primary objective of the present invention is to provide a lawn sprinkler capable of automatic adjustment of its revolving angle.

In keeping with the principle of the present invention, the foregoing objective of the present invention is attained by a revolving lawn sprinkler comprising a revolving guide plate by which the water flow is so controlled as to actuate a lobed wheel, which in turn actuates via a transmission mechanism a rotary disk. A nozzle is mounted on the rotary disk and is provided with a movable joint. The revolving guide plate is forced to change its revolving direction at such time when a projection of the rotary disk comes in contact with a locating block of the top cover of a housing of the sprinkler.

The features and the advantages of the present invention will be more readily understood upon a thoughtful deliberation of the following detailed description of the present invention with reference to the accompanying drawings.

DETAILED DESCRIPTION OF THE INVENTION

Figure 1:
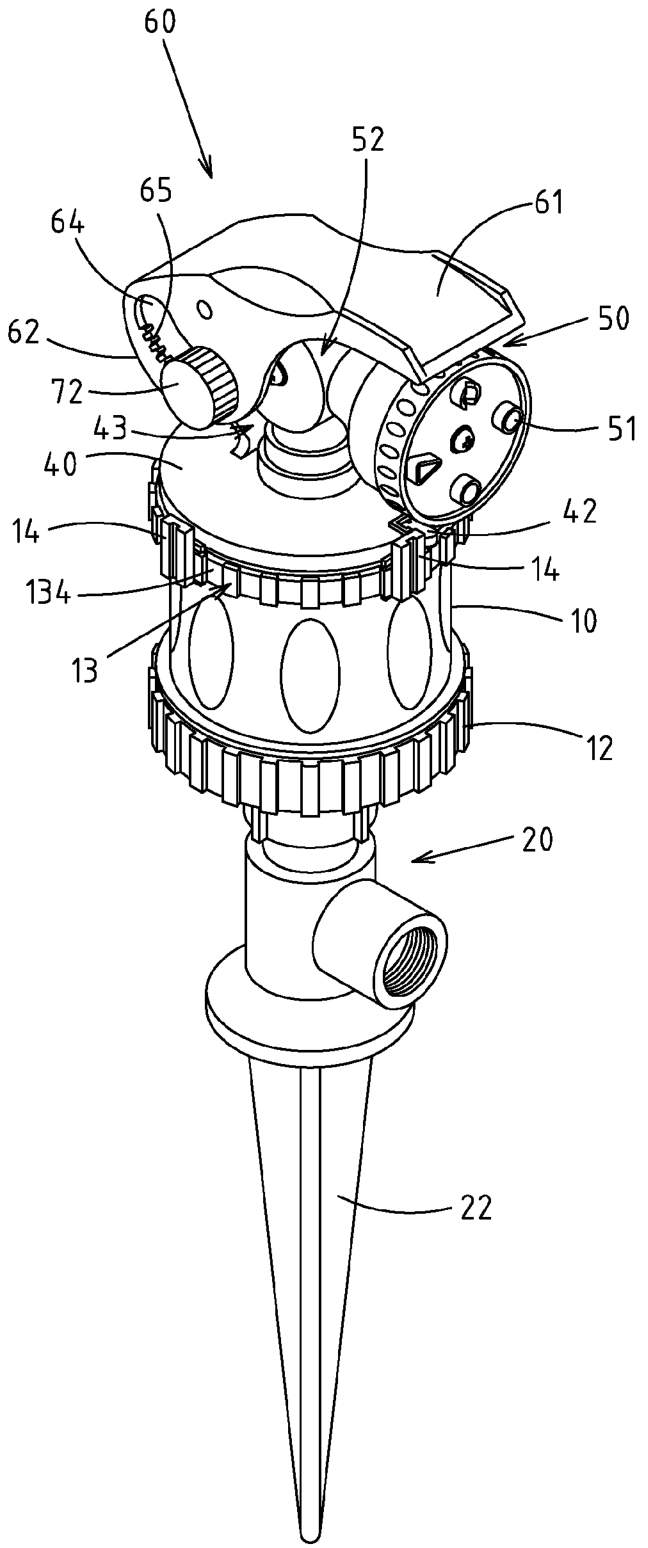
FIG. 1 shows a perspective view of the present invention.
Figure 2:
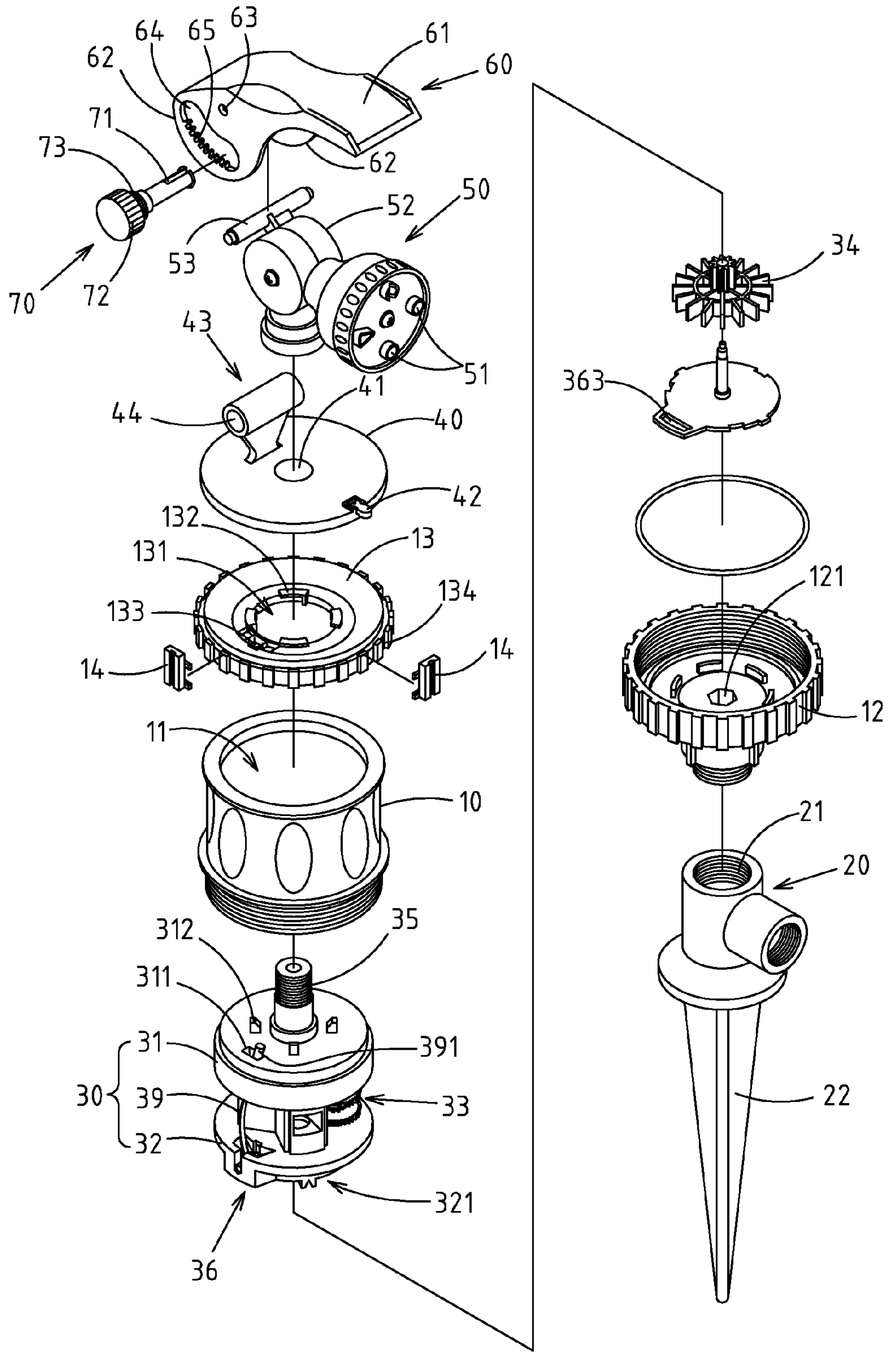
FIG. 2 shows an exploded view of the present invention.

As shown in FIGS. 1–5, a lawn sprinkler embodied in the present invention comprises the component parts, which are described hereinafter.

A housing 10 is of a cylindrical construction and is provided in the interior with a space 11. The bottom of the housing 10 is sealed off by a bottom cover 12, which is provided in the center with a through hole 121. The top of the housing 10 is sealed off by a top cover 13 which is pivoted and provided in the center with a through port 131. The through port 131 is provided in the periphery with a plurality of stop edges 132 which are arranged at intervals. The top cover 13 is provided with a slot 133 and a plurality of retaining slots 134 which are arranged at intervals for retaining an angle locating block 14.

Figure 4:
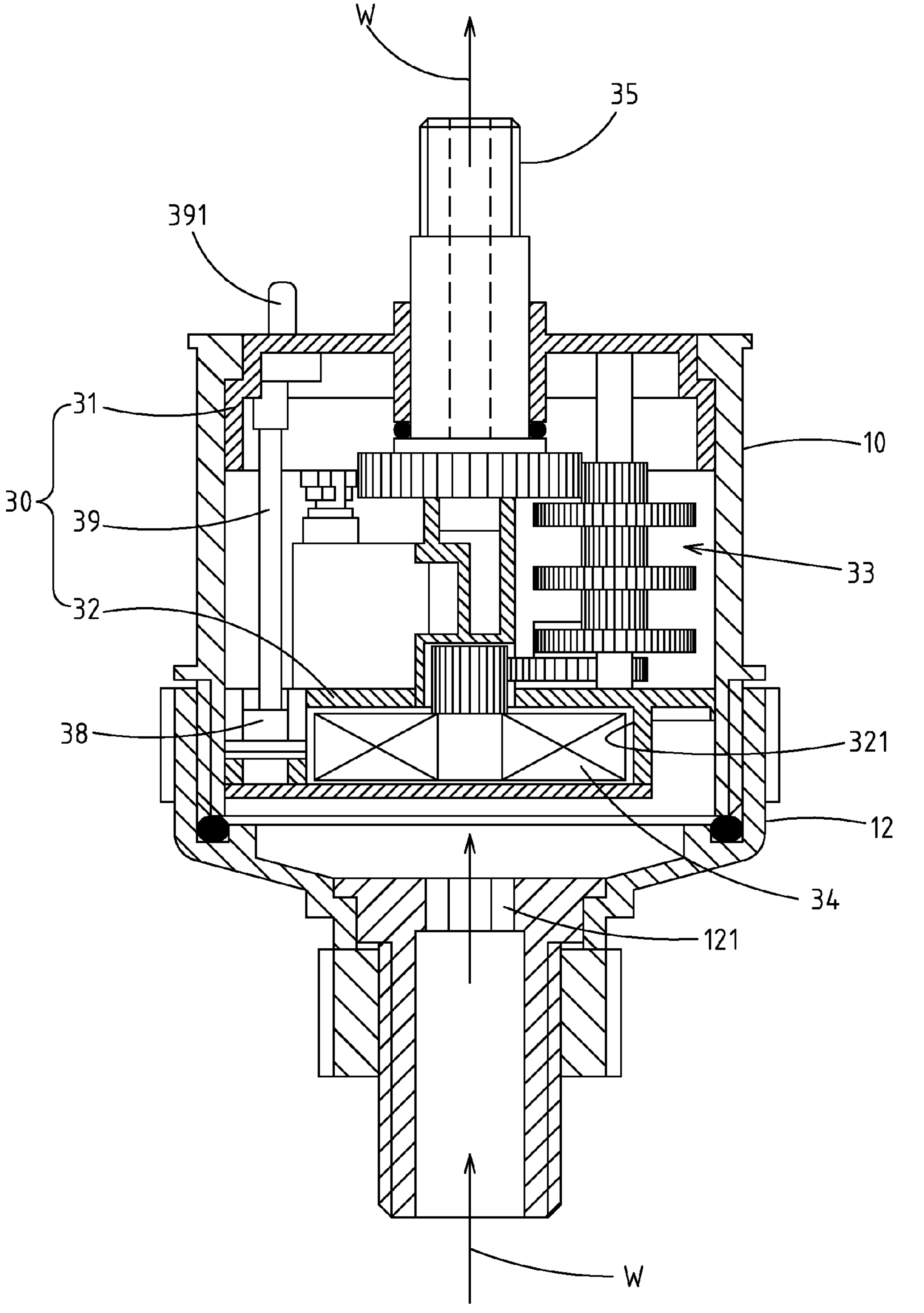
FIG. 4 shows a sectional schematic view of the transmission mechanism of the present invention.

A stationary portion 20 is fastened at the top end with the bottom cover 12 of the housing 10 and is provided in the interior with a water duct 21 in communication with the through hole 121 of the bottom cover 12, as shown in FIG. 4. The stationary portion 20 is provided with a tapered rod 22, which is inserted into the lawn soil.

Figure 5:
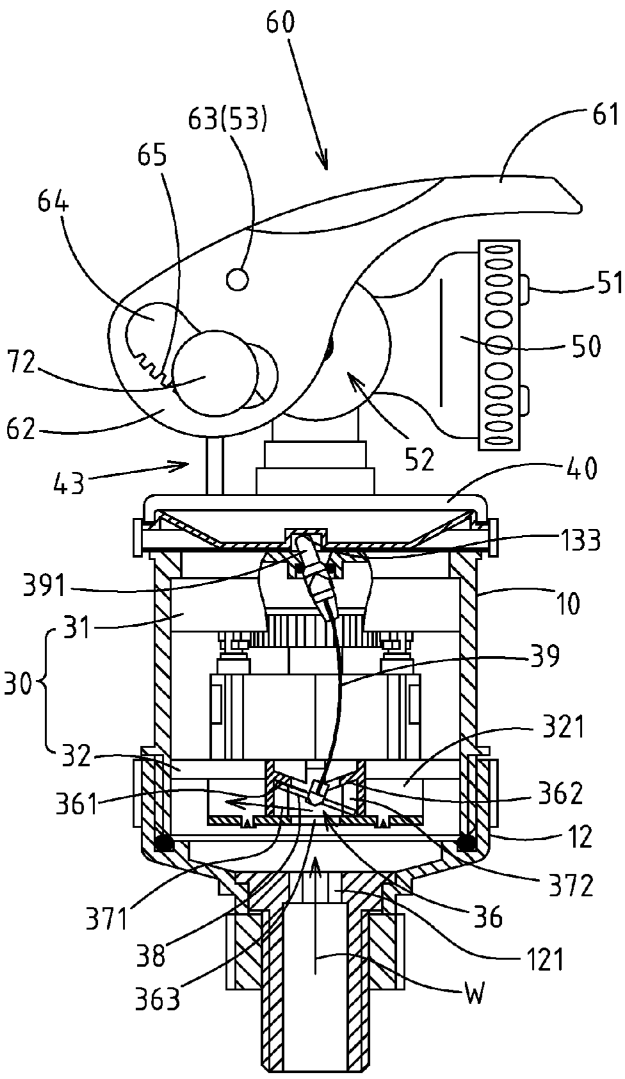
FIG. 5 shows a sectional schematic view of a first preferred embodiment of the present invention in action.

A transmission mechanism 30 is mounted in the space of the interior of the housing and is formed of an upper seat 31, a lower seat 32, and a deceleration gear set 33 located between the upper seat 31 and the lower seat 32 such that the deceleration gear set 33 is actuated by a lobed wheel 34 which is located in a round guide slot 321 of the lower seat 32, and that the deceleration gear set 33 actuates indirectly a threaded tube 35 of the top of the upper seat 31. The threaded tube 35 is extended through the through port 131 of the top cover 13 of the housing 10. The guide slot 321 is provided with a distribution slot 36 having two inclined surfaces 361 and 362, as shown in FIG. 5. The distribution slot is provided with a first water admission hole 371 and a second water admission hole 372, which are in communication with the guide slot 321. A revolving guide plate 38 is disposed in the distribution slot 36 such that an admission port 363 of the distribution slot 36 is in communication with the through hole 121 of the bottom cover 12. The guide plate 38 is provided with an arcuate elastic plate 39 which is provided with an actuation projection 391. The actuation projection 391 is confined in a confinement through hole 311 of the upper seat 31 and is extended into the slot 133 of the top cover 13. The threaded tube 35 is provided in periphery with a plurality of protuberances 312 which are arranged at intervals for stopping the top edges 132 of the top cover 13, thereby confining the clockwise rotational angle and the counterclockwise rotational angle of the top cover 13.

A rotary disk 40 is mounted on the top cover 13 of the housing 10 and is provided in the center with a through hole 41 for receiving the threaded tube 35 of the top of the upper seat 31. The rotary disk 40 is provided in periphery with a projection 42 for pushing the angle locating block of the top cover 13. The rotary disk 40 is further provided with a protruded seat 43, which is provided at the top with a horizontally oriented shaft hole 44.

An adjustable nozzle 50 is mounted on the rotary disk 40 such that the bottom of the nozzle 50 is fastened with the threaded tube 35 of the transmission mechanism 30. The nozzle 50 is provided at the top with a plurality of spray holes 51. The nozzle 50 is provided in the midsection with a movable joint 52 for adjusting the longitudinal inclination of the nozzle 50. The movable joint 52 is provided with a horizontal pin 53.

An adjustable obstruction cover 60 is mounted over the nozzle 50 and is provided at the top with an obstruction plate 61 obstructing the spray holes 51 of the nozzle 50. The obstruction plate 61 is provided with two lugs 62, which are provided with a pin hole 63 for receiving one of two ends of the horizontal pin 53. One of the two lugs 62 is provided with an arcuate slot 64 having a circle center which is the pin hole 63. The arcuate slot 64 is located at one end of the shaft hole 44 and is provided in the bottom wall with a rack 65, and a locating member 70 having a retaining section 71 which is received in the shaft hole 44 of the protruded seat 43. The locating member 70 is provided with a turning knob 72 having an outer diameter greater than the arcuate slot 64. The turning knob is provided with a gear 73 which is engaged with the rack 65 of the arcuate slot 64. The upright inclination of the obstruction cover 60 is adjusted by turning the knob 72.

Figure 15:
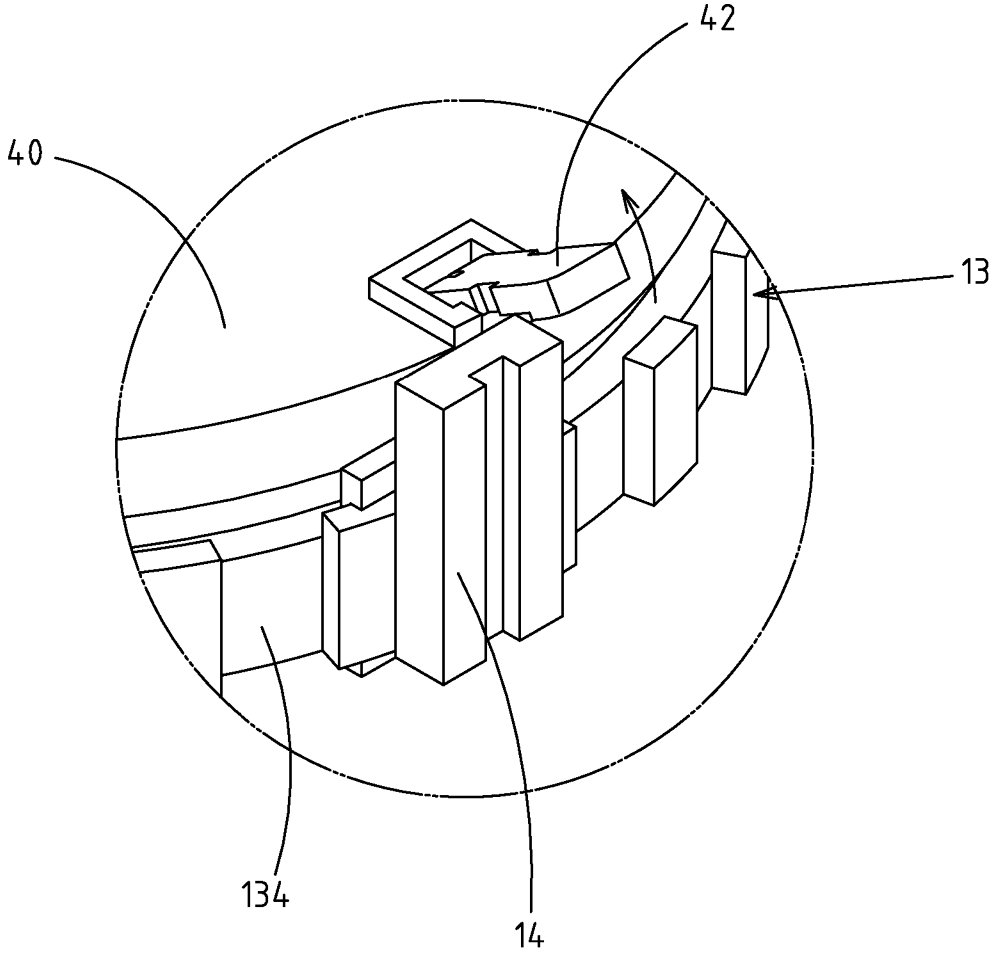
FIG. 15 shows a schematic view of the action of the projection of the rotary disk of the present invention.

The projection 42 of the rotary disk 40 is capable of upright swivel. When the projection 42 swivels upward, as shown in FIG. 15, the function of the angle locating block 14 of the top cover 13 is relieved.

The spray holes 51 of the nozzle 50 are arranged in such a pattern that they can be revolved in multiple steps.

Figure 6:
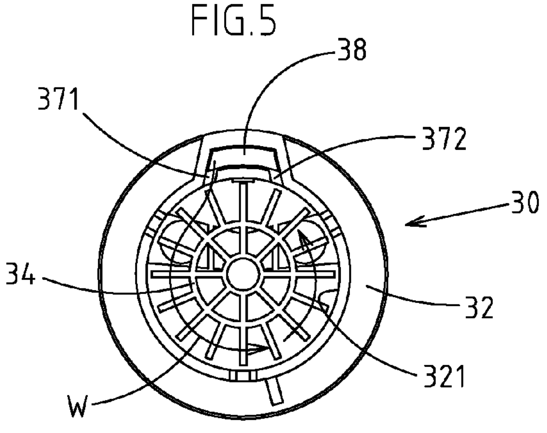
FIG. 6 shows a schematic view of the action of the lobed wheel of the first preferred embodiment of the present invention.
Figure 7:
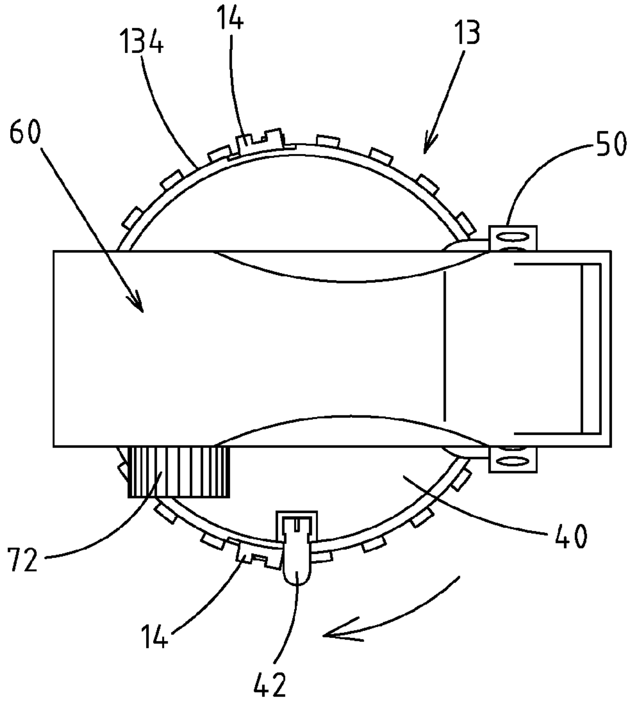
FIG. 7 shows a top plan view of the lobed wheel of the first preferred embodiment of the present invention in action.
Figure 8:
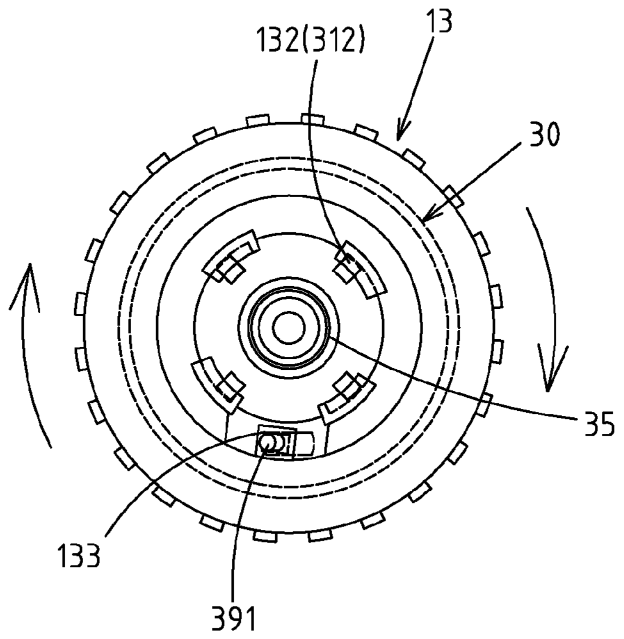
FIG. 8 shows another schematic view of the lobed wheel of the first preferred embodiment of the present invention in action.
Figure 9:
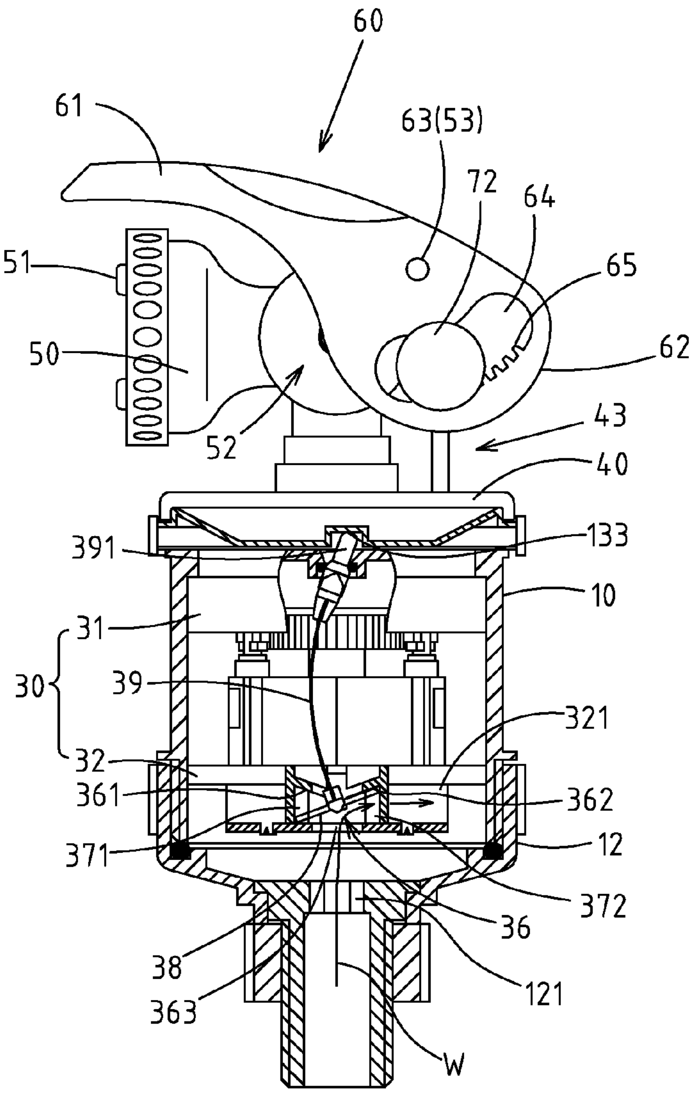
FIG. 9 shows a sectional schematic view of a second preferred embodiment of the present invention in action.
Figure 10:
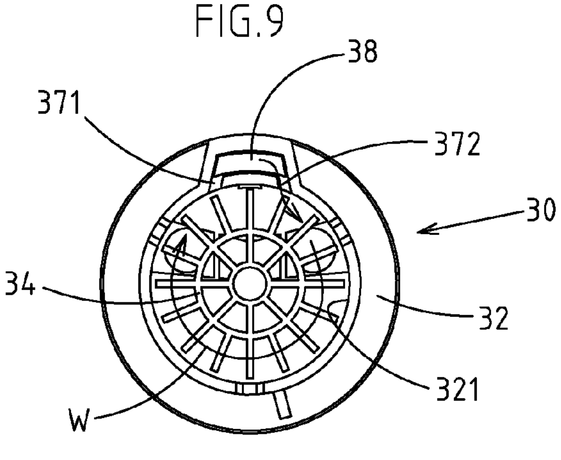
FIG. 10 shows a schematic view of the action of the lobed wheel of the second preferred embodiment of the present invention.
Figure 11:
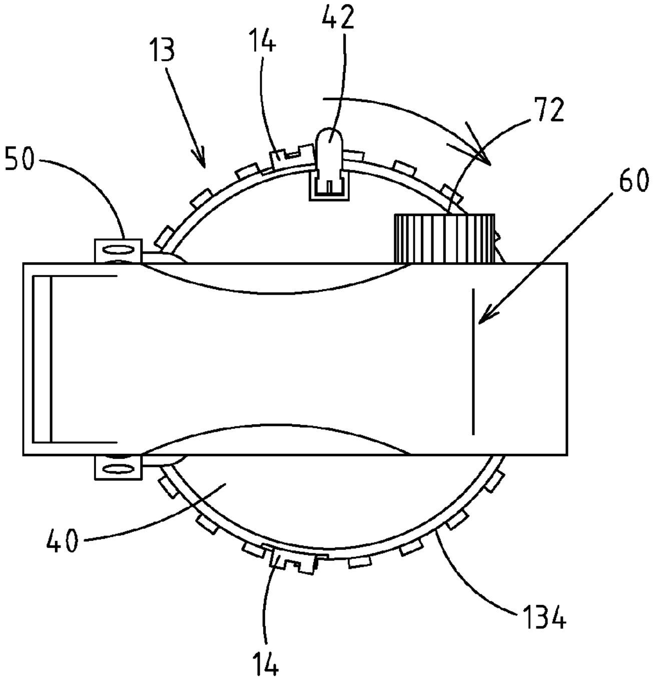
FIG. 11 shows a top plan view of the lobed wheel of the second preferred embodiment of the present invention in action.
Figure 12:
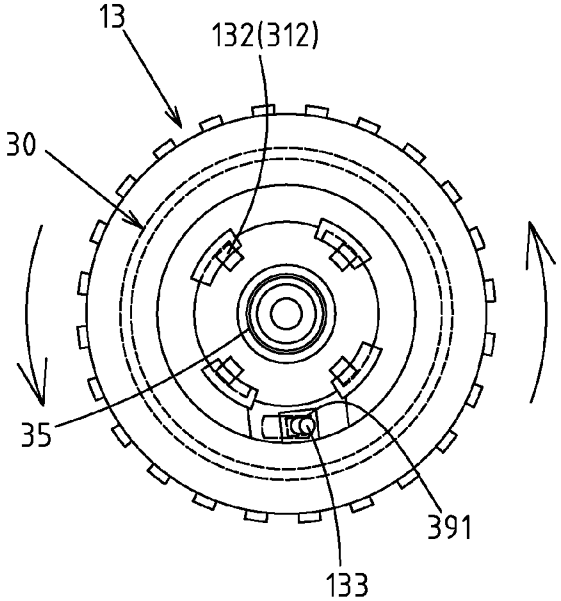
FIG. 12 shows another schematic view of the lobed wheel of the second preferred embodiment of the present invention in action.
Figure 13:
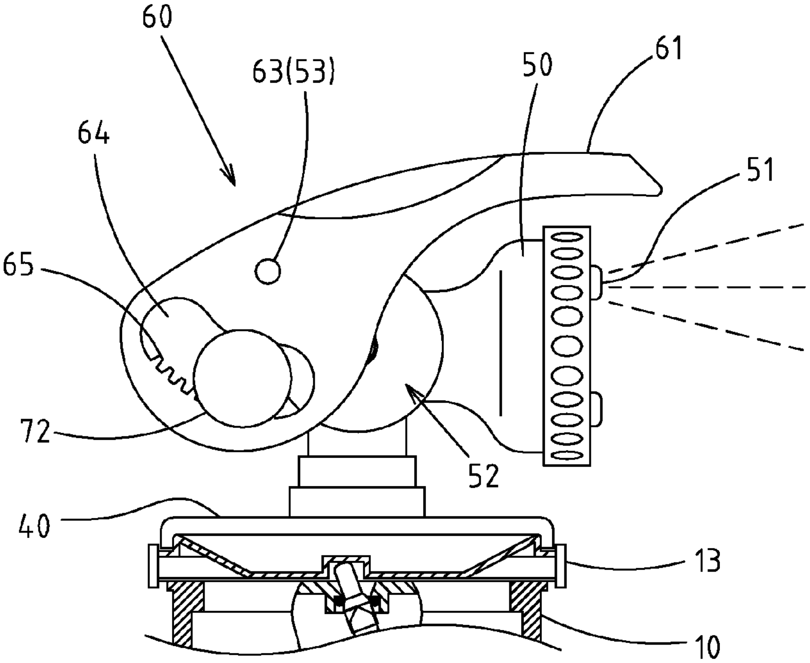
FIG. 13 shows a schematic view of angular adjustment of the nozzle of the present invention.
Figure 14:
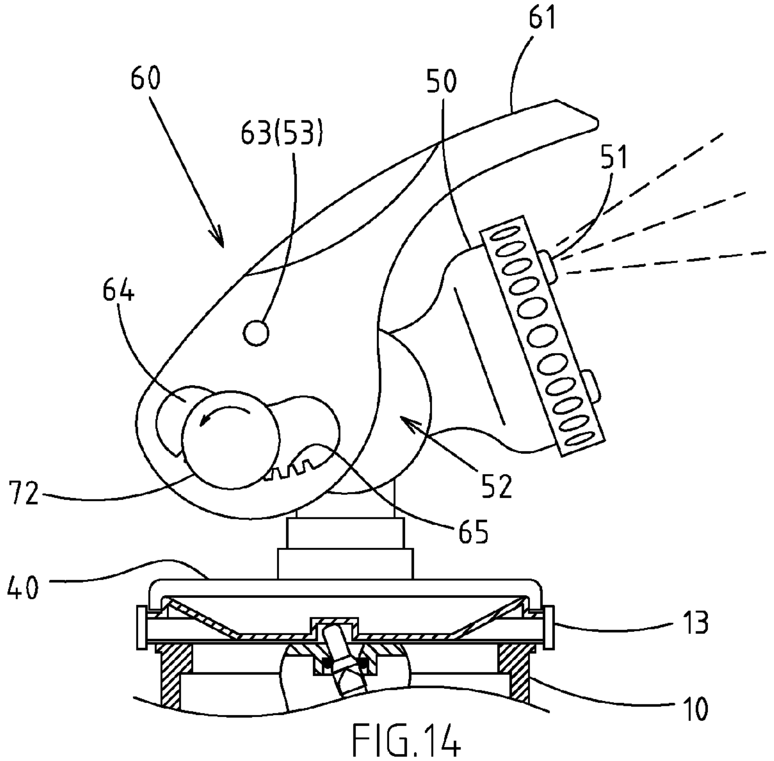
FIG. 14 shows another schematic view of angular adjustment of the nozzle of the present invention.

As water "w" enters the through hole 121 of the bottom cover 12, the water is guided into the distribution slot 36 via the admission port 363. Depending on the revolving direction of the guide plate 38, the water flows into the guide slot 321 via the first water admission hole 371, as shown in FIGS. 5 and 6, or via the second water admission hole 372, as shown in FIGS. 7 and 8, thereby determining the revolving direction of the lobed wheel 34. After the lobed wheel 34 is driven, as shown in FIG. 4, the deceleration gear set 33 is actuated so as to cause the threaded tube 35 to turn. As a result, the rotary disk 40 and the nozzle 50 are driven to turn.

Figure 3:
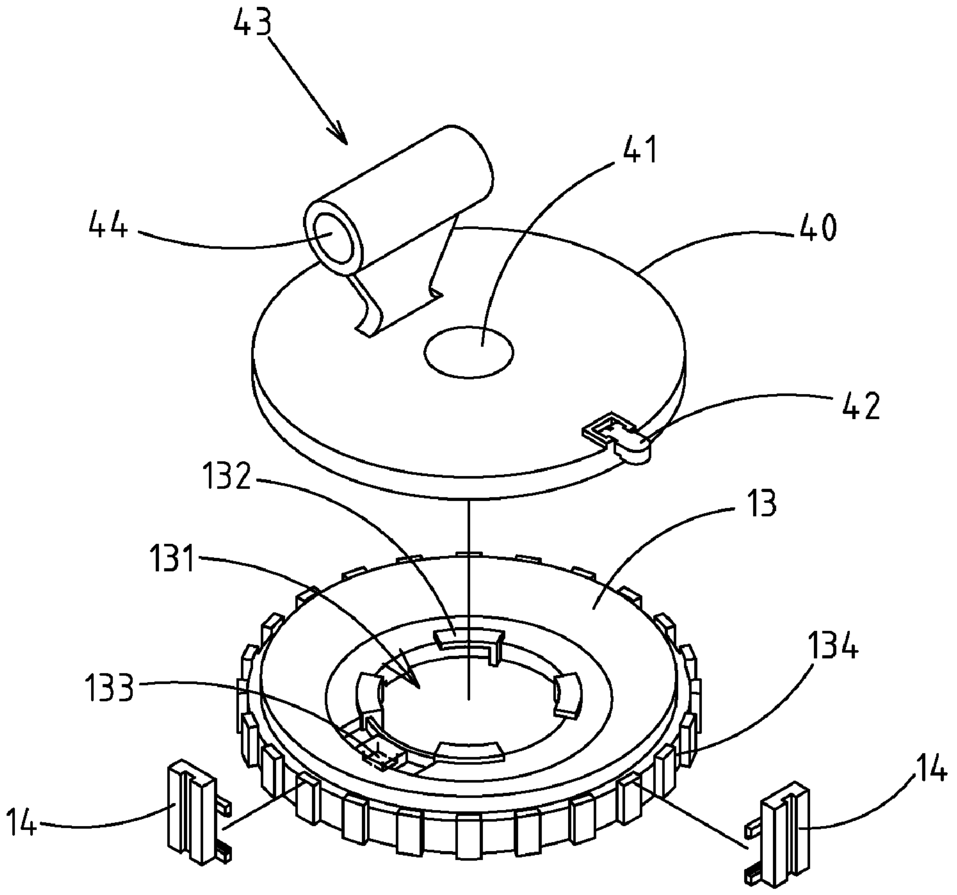
FIG. 3 shows a partial enlarged view of the present invention.

As shown in FIG. 3, the angle, such as 90 degrees or 180 degrees, can be adjusted beforehand by aligning a specific retaining slot 134 with the angle locating block 14. As a result, each time when the projection 42 of the rotary disk 40 comes in contact with the angle locating block 14 of the top cover 13, the actuation projection 391 is pushed to result in a change in arcuate direction of the arcuate elastic plate 39 by virtue of the displacement of the slot 133 of the top cover 13. As a result, the revolving direction of the guide plate 38 is changed. Accordingly, the rotational direction of the lobed wheel 34 is changed. The nozzle 50 and the rotary disk 40 turn in opposite direction.

As shown in FIG. 15, the projection 42 of the rotary disk 40 is moved upward to prevent automatic change in rotational direction in the event that the function of the angular adjustment described above is not needed. As a result, the nozzle 50 is caused to turn continuously in one direction to bring about a 360-degree sprinkle.

I claim:

1. A lawn sprinkler comprising:

a housing of a cylindrical construction and provided with a receiving space, a bottom cover to seal off a bottom end thereof, and a top cover to seal off a top end thereof, said bottom cover being provided with a through hole, said top cover being provided with a through port which is provided in a periphery with a plurality of stop edges arranged at intervals, said top cover being further provided with a slot and a plurality of retaining slots arranged at intervals for retaining an angle locating block;

a stationary portion fastened at a top with said bottom cover of said housing and provided in an interior with a water duct in communication with said through hole of said bottom cover of said housing, said stationary portion further provided with a tapered rod which is used to locate the lawn sprinkler by inserting said tapered rod into a lawn soil;

a transmission mechanism mounted in said space of said housing and formed of an upper seat, a lower seat, and a deceleration gear set located between said upper seat and said lower seat such that said deceleration gear set is actuated by a lobed wheel which is located in a guide slot of said lower seat, and that said deceleration gear set actuates indirectly a threaded tube of said upper seat, with said threaded tube extending through said through port of said top cover of said housing, said guide slot being provided with a distribution slot which is provided with a first water admission hole and a second water admission hole, said distribution slot further provided therein with a revolving guide plate such that an admission port of said distribution slot is in communication with said through hole of said bottom cover, said guide plate being provided with an arcuate elastic plate which is provided with an actuation projection being confined in a confinement through hole of said upper seat and extending into said slot of said top cover, said threaded tube being provided in a periphery with a plurality of protuberances for stopping said stop edges of said top cover, thereby confining a clockwise rotational angle and a counterclockwise rotational angle of said top cover;

a rotary disk mounted on said top cover of said housing and provided with a through hole for receiving said threaded tube of said upper seat, said rotary disk further provided in a periphery with a projection for pushing said angle locating block of said top cover, said rotary disk further provided with a protruded seat which is provided with a shaft hole;

an adjustable nozzle mounted on said rotary disk such that a bottom of said nozzle is fastened with said threaded tube, said nozzle being provided at a top thereof with a plurality of spray holes, and in a midsection thereof with a movable joint for adjusting an inclination of said nozzle, said movable joint being provided with a pin; and an adjustable obstruction cover mounted over said nozzle and provided with an obstruction plate for obstructing said spray holes of said nozzle, said obstruction plate being provided with two lugs which are provided with a pin hole for receiving one of two ends of said horizontal pin whereby one of said two lugs is provided with an arcuate slot, said pin hole serving as a circle center of said arcuate slot, said arcute slot being provided in a bottom wall with a rack and a locating member having a retaining section which is received in said shaft hole of said protruded seat, said locating member being provided with a knob having an outer diameter greater than said arcuate slot, said knob being provided with a gear which is engaged with said rack of said arcuate slot, said knob being used to adjust an inclination of said obstruction cover.

2. The lawn sprinkler as defined in claim 1, wherein said projection of said rotary disk swivels upward to relieve an act of said angle locating block of said top cover.

3. The lawn sprinkler as defined in claim 1, wherein said spray holes of said nozzle are arranged in a pattern that said spray holes revolve in multiple steps.

* * * * *